United States Patent [19]

Moorhouse et al.

[11] 4,059,159

[45] Nov. 22, 1977

[54] AGRICULTURAL TRACTOR WITH DRAFT LOAD SENSING SPRINGS FOR POWER LIFT CONTROL

[75] Inventors: Stephen Moorhouse; Harry Horsfall, both of Huddersfield; Alan Rangeley Dean, Brighouse, all of England

[73] Assignee: David Brown Tractors Limited, Huddersfield, England

[21] Appl. No.: 615,298

[22] Filed: Sept. 22, 1975

[30] Foreign Application Priority Data

Oct. 2, 1974   United Kingdom ............... 42671/74

[51] Int. Cl.² ............................................ A01B 63/112
[52] U.S. Cl. ..................................... 172/7; 33/147 K
[58] Field of Search ......................... 172/7, 9, 10, 450; 280/446 A; 33/146, 147 K, 144

[56] References Cited

U.S. PATENT DOCUMENTS

| | | | |
|---|---|---|---|
| 2,832,148 | 4/1958 | Rousse | 33/144 |
| 3,342,274 | 9/1967 | Wridt, Jr. | 172/7 |
| 3,375,876 | 4/1968 | Engelmann | 172/7 X |
| 3,399,733 | 9/1968 | North | 172/9 |
| 3,527,305 | 9/1970 | Dollase | 172/9 |

FOREIGN PATENT DOCUMENTS 2,508,620  8/1975   Germany ............................. 172/7

*Primary Examiner*—Richard T. Stouffer
*Attorney, Agent, or Firm*—Norris & Bateman

[57] ABSTRACT

A tractor has a power lift mechanism controllable automatically in known manner by implement draft load sensing apparatus. This apparatus comprises two leaf springs which are spaced apart in a lateral direction relative to the tractor, the springs being connected at their front ends to the tractor and being adapted to flex in the lateral direction but being stiff longitudinally of the tractor and vertically; two hitch links each connected to the rear end of one of the springs; and equipment for transmitting to the power lift mechanism a control signal derived from any variation in the distance between the flexible portions of the springs.

11 Claims, 2 Drawing Figures

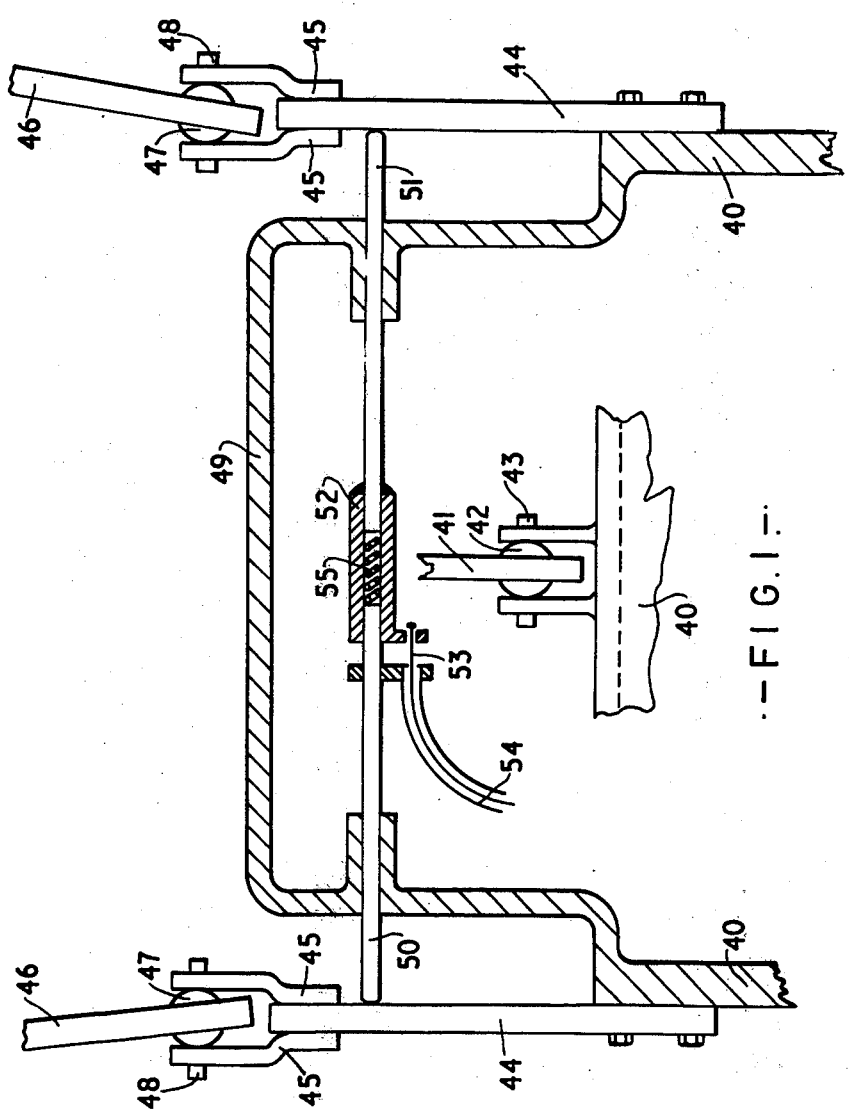

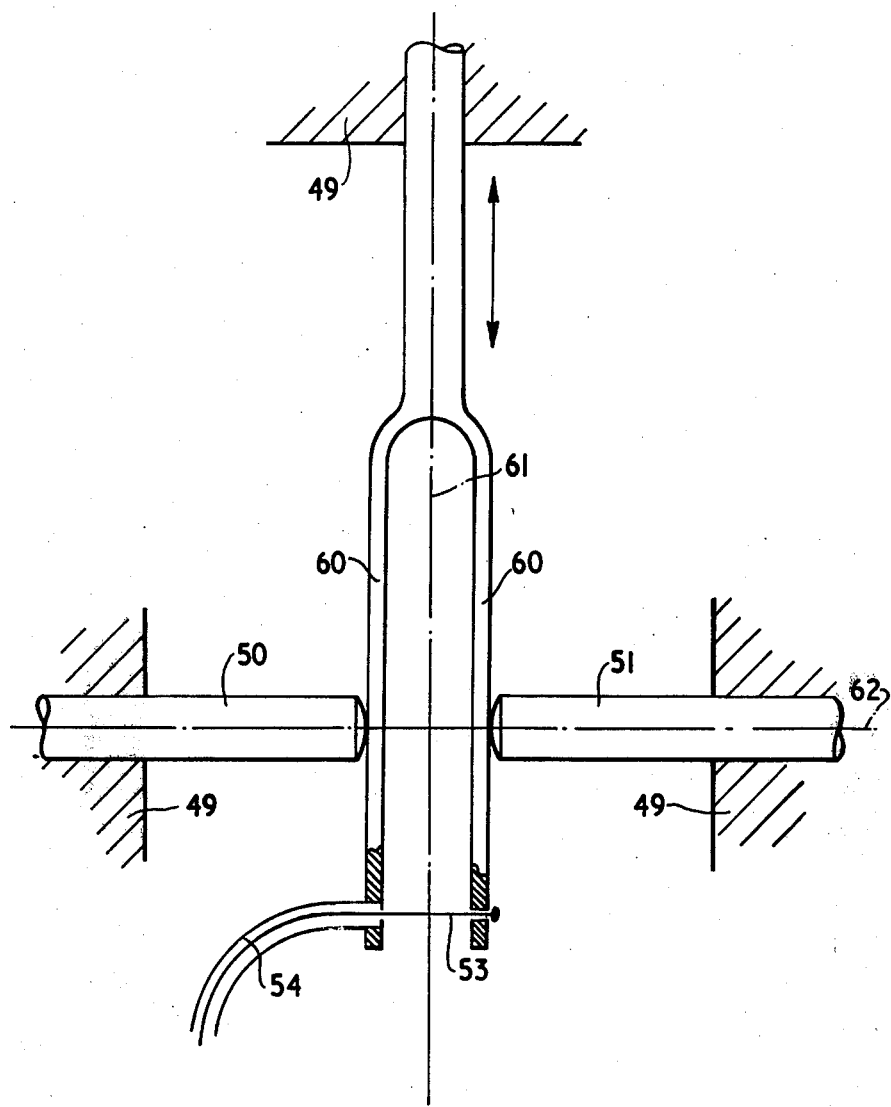
—FIG.2—

AGRICULTURAL TRACTOR WITH DRAFT LOAD SENSING SPRINGS FOR POWER LIFT CONTROL

BACKGROUND OF INVENTION

The invention relates to agricultural tractors having means for sensing implement draft load and a power lift mechanism controllable by said means.

SUMMARY OF INVENTION

According to the invention, in an agricultural tractor having means for sensing implement draft load and a power lift mechanism controllable by said means the means for sensing implement draft load comprise two parallel straight or cranked leaf springs which are spaced apart in a lateral direction relative to the tractor, said springs being rigidly connected at their front ends to the frame of the tractor and adapted to flex in said direction, two hitch links each of which is connected to the rear end of one of the springs, the arrangement being such that a draft load applied to the link causes flexing of the spring in said direction, and means for transmitting to the power lift mechanism a signal derived from any variation in the distance between the flexible portions of the springs.

BRIEF DESCRIPTION OF DRAWINGS

The invention will now be described, by way of example, with reference to the accompanying drawings of which:

FIG. 1 is a semi-diagrammatic plan view of implement attachment and draft load sensing means;

FIG. 2 is a semi-diagrammatic view of sensitivity varying means for the apparatus of FIG. 1.

DESCRIPTION OF PREFERRED EMBODIMENT

Referring now to FIG. 1, an agricultural tractor has a frame 40 to which a central upper hitch link 41 of a three-link hitch is directly connected by means of a ball joint 42 and a hitch pin 43. A conventional power lift mechanism (not shown) is arranged to operate the three-link hitch in accordance with signals fed to it from means for sensing implement draft load. Said means comprise two straight cantilever leaf springs 44 which are spaced apart in a lateral direction relative to the tractor and are therefore parallel to one another. Said springs are rigidly anchored at their front ends to, and project rearwardly from, the frame 40. The vertical dimension of each spring 44 is serveral times greater than the lateral dimension thereof so that both of said springs are adapted to flex in a lateral direction relative to the tractor but are stiff longitudinally of the tractor and vertically. A clevis 45 is fixed to the free end of each spring 44, and the front end of one of the two lower hitch links 46 of the three-link hitch is connected between the arms of each clevis by means of a ball joint 47 and a hitch pin 48. Means for transmitting to the power lift mechanism a signal derived from any variation in the distance between the flexible portions of the springs 44 include a hollow rearward projection 49 on the frame 40 between the two springs 44, said projection slideably housing two co-axial rods 50, 51 which extend in a lateral direction relative to the tractor. The inner end of the rod 50 is slideable in a sleeve 52 welded to the inner end of the rod 51, and a helical compression spring 55 is confined within said sleeve between the inner ends of the rods 50, 51. The outer ends of said rods are urged by the spring 55 into contact with the flexible portions of the respective springs 44, and the rod 50 and the sleeve 52 are moveable relative to one another as hereinafter described and control the power lift mechanism. To this end the rod 50 and the sleeve 52 are connected to the control valve of the power lift mechanism by a linkage or the like comprising a Bowden cable. At one end of said cable its wire 53 is secured to the sleeve 52 while its case 54 is secured to the rod 50, and at its other end the cable is arranged to operate the control valve. The Bowden cable is housed within the projection 49, safe from dirt and physical damage.

In operation, the two lower hitch links 49 normally diverge rearwardly as shown, so that the line of action of an implement draft load applied to each of said links is offset from the anchorage of the associated spring 44 in order to apply a bending moment to said spring and thus cause flexing of the spring in a lateral direction relative to the tractor. The resulting deflection of the two springs 44 is sensed by the two rods 50, 51, causing the relative movement between the rod 50 and the sleeve 52 to vary as the sum of the deflections in both of said springs. Movement of the control valve of the power lift mechanism by the Bowden cable is proportional to said relative movement. The load/deflection curve of the springs 44 is non-linear, the deflection increasing disproportionately with increasing load in a normally advantageous manner due to the lever arm of the bending moment decreasing as the load increases.

In a modification, means having non-linear characteristics adapted to compensate for the non-linear load/deflection curve of the springs are provided in the linkage or the like for transmitting the signal to the control valve.

In another modification shown in FIG. 2, the overall sensitivity of the draft load sensing means is variable by dispensing with the sleeve 52 and the spring 55 and interposing between the inner ends of the two rods 50, 51 a spring steel fork 60 which is adjustable along an axis 61 intersecting the common axis 62 of said rods at right angles. The free ends of the arms of the fork 60 are connected respectively to the wire 53 and the case 54 at one end of the Bowden cable, the other end of said cable being arranged to operate the control valve of the power lift mechanism as before. The sum of the deflections of the two leaf springs 44 is caused to produce varying amounts of movement of the control valve by adjusting the position of the fork 60 and thus varying the distance between the free ends of its arms for any given distance between the inner ends of the rods 50, 51. In a variation of this modification, the arms of the spring steel fork 60 are replaced by two relatively pivotable arms urged apart by a helical compressing spring.

In a further modification, where the two lower hitch links are parallel to one another and no bending moment would thus be applied to straight, parallel springs, or where said links are diverging but a larger bending moment is required to be applied to the springs due for example to implements of very light draft being employed, said springs are cranked as seen in plan view, with parallel anchorages and free ends, the anchorages being spaced further apart than the free ends.

In yet another modification, the two rods are slideable relative to one another along parallel paths, instead of being co-axial.

The invention provides means for sensing implement draft load which has a minimum of moving parts and a high degree of sensitivity whilst being insensitive to vertical loads exerted on the tractor by an implement hitched hereto.

We claim:

1. An argicultural tractor having means for sensing implement draft load and a power lift mechanism controllable by said means, wherein the means for sensing implement draft load comprise two parallel leaf springs which are spaced apart in a lateral direction relative to the tractor, said spring being rigidly anchored at their spaced apart front ends to the frame of the tractor and having flexible portions adapted to flex in said direction, two connector means each of which is fixed to the rear end of one of the springs, two hitch links each of which is connected to one of the connector means, the arrangement being such that a draft load applied to a link causes flexing of the associated spring in said direction, and means for transmitting to the power lift mechanism a signal derived from any variation in the distance between the flexible portions of the springs.

2. An argicultural tractor according to claim 1, wherein the springs are straight.

3. An agricultural tractor according to claim 1, wherein each connector means comprises a clevis and each hitch link is connected to a hitch pin between the arms of one of the clevises.

4. An agricultural tractor according to claim 1, wherein the signal transmitting means comprise two members slideable relative to one another along aligned paths by the flexible portions of the respective springs, and a linkage for transmitting relative movement of the two members to the power lift mechanism.

5. An agricultural tractor according to claim 4, wherein the linkage comprises a Bowden cable.

6. An agricultural tractor according to claim 1, wherein means are provided for varying the sensitivity of the means for sensing implement draft load.

7. An agricultural tractor according to claim 1, wherein the signal transmitting means comprise two members slideable relative to one another along aligned paths by the flexible portions of the respective springs, and a linkage for transmitting relative movement of the two members to the power lift mechanism; and wherein means are provided for varying the sensitivity of the means for sensing implement draft load, the sensitivity varying means comprising a spring fork interposed between the adjacent ends of the two members and adjustable along a path perpendicular to the paths of said members.

8. An agricultural tractor according to claim 1, wherein the signal transmitted to the power lift mechainsm is proportional to any variation in the distance between the flexible portions of the springs.

9. An agricultural tractor according to claim 1, wherein the signal transmitting means are provided with characteristics for modifying the signal derived from any variation in the distance between the flexible portions of the springs.

10. An agricultural tractor according to claim 9, wherein the signal transmitting means are provided with non-linear characteristics adapted to compensate for the non-linear load/deflection curve of the springs.

11. An agricultural tractor having means for sensing implement draft load and a power lift mechanism controllable by said means, wherein the means for sensing implement draft load comprise two parallel leaf springs which are spaced apart in a lateral direction relative to the tractor, said springs being rigidly anchored at their spaced apart front ends to the frame of the tractor and having flexible portions adapted to flex in said direction, two hitch links each of which is connected to the rear end of one of the springs, the arrangement being such that a draft load applied to a link causes flexing of the associated spring in said direction, a hollow projection on the frame of the tractor disposed between the springs, and means housed in said projection for transmitting to the power lift mechanism a signal derived from any variation in the distance between the flexible portions of the springs.

* * * * *